June 28, 1938.   D. O. DRUGE ET AL   2,121,863
FAUCET
Filed April 29, 1935
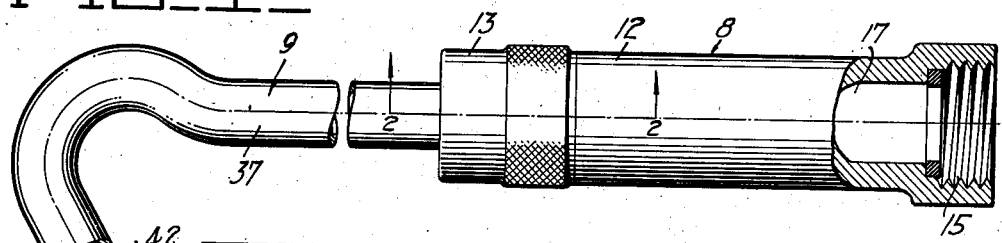
FIG_1_
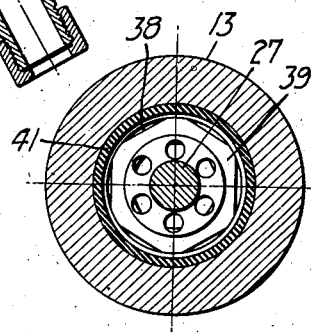
FIG_3_
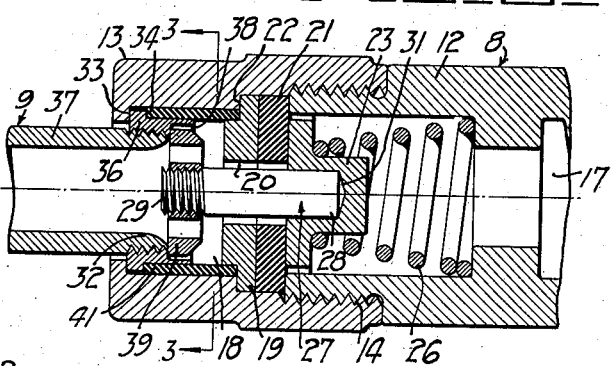
FIG_2_
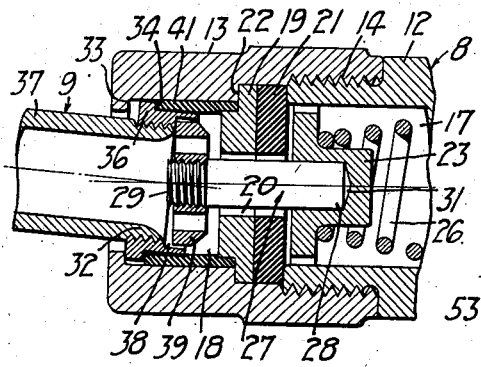
FIG_4_
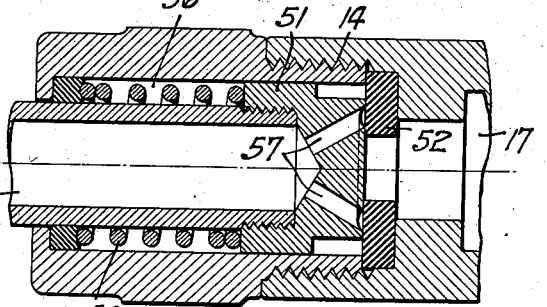
FIG_5_
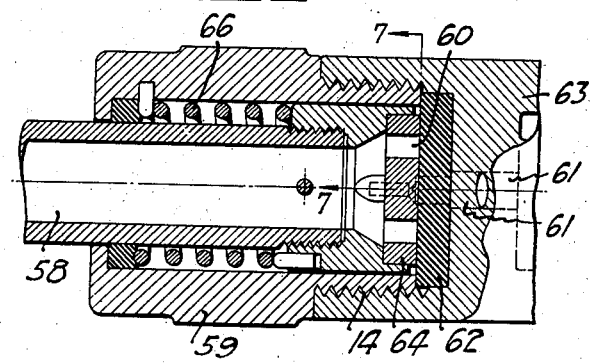
FIG_6_
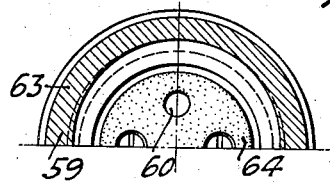
FIG_7_
INVENTORS
Daniel O. Druge
Otto C. Druge
BY Joseph B. Gardner
ATTORNEY Patented June 28, 1938

2,121,863

UNITED STATES PATENT OFFICE 2,121,863

FAUCET

Daniel O. Druge and Otto C. Druge,
Oakland, Calif.

Application April 29, 1935, Serial No. 18,782

2 Claims. (Cl. 251—115)

The invention relates to faucets and particularly to automatic faucets for use in filling automobile radiators, and the like.

An object of the invention is to provide an automatic shut-off faucet which may be operated without, and will have entirely removed therefrom, the usual lever, handle, or the like, for controlling the discharge of the liquid.

Another object of the invention is to provide an automatic shut-off faucet, in which discharge of the liquid from the faucet is controlled by effecting a relative movement between the body of the faucet and the spout portion.

A further object of the invention is to provide a faucet in which the delivery tube or spout although movable with respect to the body portion of the faucet for the purpose of controlling the liquid discharge, will remain in substantial coaxial relationship with said body both in the open as well as in the closed position of the faucet.

A still further object of the invention is to provide a faucet of the character described which will afford complete protection against leakage and drip, yet will not require the use of a packing gland or wearing parts.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a side view partly in section, of the faucet of our invention.

Figure 2 is a fragmental sectional view of the faucet on a larger scale, and showing the faucet in closed position.

Figure 3 is a transverse sectional view of the faucet taken on the line 3—3 of Figure 2.

Figure 4 is a view the same as Figure 2, but with the faucet in open position.

Figures 5 and 6 are fragmental sectional views illustrating modified forms of the invention.

Figure 7 is a transverse fragmental sectional view of the faucet taken on the line 7—7 of Figure 6.

In the embodiment of the invention illustrated in Figures 1 to 4, the faucet comprises what may for convenience in description, be considered two distinct, but cooperating, parts, to wit, the faucet body 8 and the faucet delivery tube or spout 9. These parts are arranged to be connected together preferably in coaxial relationship and for relative movement so that by varying the relative positions of the parts the amount of liquid discharged from the faucet may be controlled. In the present instance the faucet is designed to provide automatic shut-off or closure and therefore manipulation of the parts is effected to place the faucet in different open positions.

For convenience in construction, and for facilitating assembly of the inside parts of the faucet, the housing of the body 8 is formed of two sections 12 and 13 removably connected by threaded portions 14 and 15 and defining inlet and delivery chambers 17 and 18, the free end of section 12 being designed for attachment to a source of fluid supply such as from a flexible hose. Dividing the chambers longitudinally of the body, is a removable partition or disc 19 having a central opening 20 through which the liquid from chamber 17 may flow into chamber 18. At the inlet side of the partition is provided a centrally perforated gasket 21 which together with the former are held in position between a shoulder 22 in the body section 13 and the adjacent end of the section 12.

Within the chamber 17 is a valve 23 which by means of a spring 26, as well as by the pressure of the liquid in the chamber, is normally held against the gasket 21 to close the opening 20. Extending through the opening in the partition and in the gasket, and in such manner as not to interfere with the flow of the liquid through such openings, is a stem 27 having its opposite ends 28 and 29 in the different chambers and with the end 28 bearing against and preferably seated in a socket 31 in the valve.

As will be apparent from Figures 2 and 4, displacement of the stem 27 in the direction of valve 23 will serve to move the latter from its seat on the gasket 21 and thereby permit the liquid in the chamber 17 to flow around the valve and through the opening 20 into chamber 18. For thus displacing the stem against the resistance of spring 26, we utilize the faucet delivery tube or spout 9 above referred to and connected as aforesaid to the faucet body for movement relative thereto. As will be clear from said figures, the tube has its inner end 32 extended into the chamber 18 and is retained therein by reason of the interengagement of annular shoulders 33 and 34 respectively provided on the body section and the spout. Preferably the shoulder 34 is formed as part of an extension 36 threadedly connected with the pipe 37 forming the major portion of the spout, the extension also serving to provide a socket or seat 38 for the reception of a perforated enlargement or plate 39 desirably adjustably fixed to the end 29 of the valve stem. With the exception of the interengaging portions of the shoulders 33 and 34, sufficient clearance is left between the spout and the spout enclosing portion of the faucet body to permit some angular movement, as between the spout and body.

It will be noted that the spring 26 not only serves to keep the valve seated, but acts to keep the enlargement 39 against the spout and consequently to retain the shoulders together and the spout in coaxial alignment with the body. In view of the foregoing, flexure, that is, angular displacement of the spout relative to the body, will be against the resistance of said spring, and in the event of such displacement, one portion of the shoulders will remain in engagement and serve as a fulcrum, while the diametrically opposed portion will be moved inwardly to effect a corresponding inward movement of the enlargement and the opening of the valve. Conversely, when the valve is held in open position, by reason of the flexure of the faucet parts will serve to automatically replace the parts in coaxial alignment and move the valve to closed position. Desirably the engagement of the valve with the side walls of the chamber 17 is such that while the liquid may pass around the periphery of the valve the latter will be slidably guided by such walls to and from the closed position. It is also preferable to bevel or curve the interior of the spout from the inner end of the pipe 37 to the base of the socket 39 so as to afford an enlarged passage for the liquid at this area.

An important feature in the construction of the faucet is the provision of effective means for preventing leakage of liquid between the relatively movable faucet parts 8 and 9. Surrounding and embracing annular portions of the extension 36 and the partition 19 is a tube 41 of rubber or other flexible material, serving to enclose and seal the space between said longitudinal separated and relatively movable members. The tube 41 is preferably supported against the annular side walls of the chamber 18 and abuts firmly at one end against the shoulder 34 of the spout member 9, and at the other end against the partition 19. The relationship and positioning of the tube 41, as thus described, obtains when the faucet parts are in coaxial relation and the valve consequently closed, and therefore when the faucet is flexed, so as to open the valve, the accompanying inward displacement of the extension 36 will serve to compress the tube to its maximum and thus insure for the open position of the valve the most effective sealing action afforded by the tube. It will also be evident that the tube assists the spring 26 in returning the parts to the normal closed position of the faucet.

As will be clear from Figure 1, the spout 9 is preferably bent at its free end to facilitate the use of the faucet for filling automobile radiators and the like. When the faucet is thus used, the operator simply places the free end of the spout in the radiator filler opening and then with the spout resting against the radiator, he presses down on the handle portion, that is the body of the faucet, until the faucet becomes flexed. When the radiator becomes filled, the operator then merely removes the spout from the opening and the flow of the liquid from the faucet automatically shuts-off. It is important to note, that not only may the spout for the purpose of opening the valve be inclined or swiveled in any direction, but the spout may with respect to the body be rotated about its own axis and therefore no twisting of the hose will be required to place the bent outer end 42 of the spout into the radiator opening.

In Figures 5, 6 and 7, we have shown the faucet modified to permit operation by manipulation other than flexing. In the embodiment illustrated in Figure 5, disengagement of the valve 51 from its seat on a gasket 52, is effected by pulling the spout 53 outwardly against the resistance of a spring 54. The valve in the design being described, is fixed to the inner end of the spout and is guided in its movement by engagement of its periphery with the side walls of the outlet chamber 56 of the faucet. On outward displacement of the valve, the valve passages 57 become uncovered and the liquid may then pass directly therefrom into the spout passage.

In the device illustrated in Figure 6, rotation of the spout 58 in the body 59 serves to move the valve openings 60 into or out of registration with openings 61 provided in the valve seat or gasket 62 and partition 63. As in the previously described embodiment, so in the present, the valve 64 is secured directly to the spout. Automatic return of the valve to shut-off position is effected by the spring 66 which also functions to keep the valve resiliently pressed against the gasket.

We claim:

1. A faucet comprising, a body portion having a fluid passage therethrough, a partition in said passage having an opening therethrough, a valve mounted in said passage at one side of said partition and movable thereto to stop the fluid flow, a spout mounted in the other of said passages at the other side of said partition and forming a discharge passage in communication therewith, means on said spout and body for retaining the spout in said passage and affording an angular displacement of said spout relative to said body, the inner end of said spout and said partition being provided with opposed annular recesses, a resilient tube clamped at its ends in said recesses and engaging the walls of said body to seal said spout passage in communication with said body passage, and means connecting said spout and valve for causing a displacement of said valve from said partition incident to an angular displacement of said spout relative to said body.

2. A faucet comprising, a body portion composed of a pair of threadably attached sections having aligned registering passages, a partition composed of rigid and resilient disc members clamped between said sections and having an opening therethrough communicating said passages, a valve mounted in one of said passages and movable to and from a seated position on said resilient disc member, a spout mounted in the other of said passages and forming a discharge passage in communication therewith, annular shoulders on said spout and body for retaining the spout in said passage and adapted for fulcruming on each other to provide an angular displacement of said spout relative to said body, the inner end of said spout and said rigid partition member being provided with opposed annular recesses, a resilient tube clamped at its ends in said recesses and engaging the walls of said body to seal said spout passage in communication with said body passages, the inner end of said spout being formed with a seat, a perforated plate mounted in said seat for longitudinal movement therein, and a stem passing through said partition opening and connecting said plate and valve for rectilineal movement of said valve upon angular displacement of said spout.

DANIEL O. DRUGE.
OTTO C. DRUGE.